(12) United States Patent
Panek et al.

(10) Patent No.: US 7,041,742 B2
(45) Date of Patent: May 9, 2006

(54) IMPACT MODIFIED THERMOPLASTIC OLEFIN COMPOSITIONS

(75) Inventors: Ann M. Panek, Brunswick, OH (US); Anna C. Andrews, Medina, OH (US); Haleh Ayrom-Keuchel, Copley, OH (US); Paul J. DeFranco, Twinsburg, OH (US); Robert J. Opalko, Middleburg Heights, OH (US)

(73) Assignee: Ferro Corporation, Cleveland, OH (US)

( * ) Notice: Subject to any disclaimer, the term of this patent is extended or adjusted under 35 U.S.C. 154(b) by 27 days.

(21) Appl. No.: 10/668,041

(22) Filed: Sep. 22, 2003

(65) Prior Publication Data

US 2004/0116560 A1 Jun. 17, 2004

Related U.S. Application Data

(60) Provisional application No. 60/414,137, filed on Sep. 27, 2002.

(51) Int. Cl.
*C08L 23/00* (2006.01)
*C08L 5/1535* (2006.01)
*C08L 5/053* (2006.01)

(52) U.S. Cl. .............. 525/240; 524/583; 524/582; 524/474; 524/111; 524/107; 524/378; 524/366; 524/377; 524/386; 524/388

(58) Field of Classification Search ........... 525/240, 525/474; 524/474, 366, 378, 377, 386, 388, 524/111, 107, 370
See application file for complete search history.

(56) References Cited

U.S. PATENT DOCUMENTS

| | | | |
|---|---|---|---|
| 3,936,512 A * | 2/1976 | Tabara et al. ............. 264/13 |
| 4,098,752 A * | 7/1978 | Ohkawa et al. ........... 524/111 |
| 4,333,974 A * | 6/1982 | Davis ....................... 428/16 |
| 4,349,601 A | 9/1982 | Brueggemann et al. |
| 4,415,691 A | 11/1983 | Allen et al. |
| 4,954,291 A | 9/1990 | Kobayashi et al. |
| 5,015,684 A | 5/1991 | Kobayashi et al. |
| 5,096,940 A * | 3/1992 | Mor ........................ 523/125 |
| 5,115,004 A | 5/1992 | Mochizuki et al. |
| 5,254,617 A * | 10/1993 | Inoue et al. ............... 524/433 |
| 5,290,822 A * | 3/1994 | Rogers et al. ............. 521/94 |
| 5,308,395 A | 5/1994 | Burditt et al. |
| 5,317,051 A | 5/1994 | Harashige et al. |
| 5,439,628 A * | 8/1995 | Huang ...................... 264/175 |
| 5,569,693 A * | 10/1996 | Doshi et al. ............... 524/317 |
| 5,962,092 A | 10/1999 | Kuo et al. |
| 6,011,086 A | 1/2000 | Grant et al. |
| 6,025,075 A | 2/2000 | Grant et al. |
| 6,028,016 A | 2/2000 | Yahiaoui et al. |
| 6,096,213 A * | 8/2000 | Radovanovic et al. . 210/500.36 |
| 6,160,048 A | 12/2000 | Uyeda et al. |
| 2001/0014384 A1 | 8/2001 | Kishine |
| 2003/0124286 A1 | 7/2003 | Kijima |

FOREIGN PATENT DOCUMENTS

JP 56-005842 A * 1/1981

OTHER PUBLICATIONS

JP 56-005842 (English abstract).*

* cited by examiner

*Primary Examiner*—David W. Wu
*Assistant Examiner*—Rip A. Lee
(74) *Attorney, Agent, or Firm*—Rankin, Hill, Porter & Clark LLP

(57) ABSTRACT

The present invention provides impact modified thermoplastic olefin ("TPO") compositions that exhibit both stiffness and toughness. TPO compositions according to the invention include a polyolefin homopolymer resin such as polypropylene, from about 17% by weight to about 30% by weight of a rubbery copolymer comprising at least one alpha olefin, and from about 1.0% to about 8.0% by weight of a nonionic surfactant, which acts as an impact modifying fluid. The preferred nonionic surfactant for use in the invention is an ethoxylated sorbitan fatty acid ester such as ethoxylated sorbitan trioleate ("ESTO").

6 Claims, 4 Drawing Sheets

IMPACT MODIFIED THERMOPLASTIC OLEFIN COMPOSITIONS

BACKGROUND OF THE INVENTION

1. Field of Invention

The present invention relates to thermoplastic olefin compositions, and more particularly, to thermoplastic olefin compositions comprising a low-temperature impact modifying fluid.

2. Description of Related Art

Thermoplastic olefin ("TPO") compositions typically comprise a blend of an olefinic homopolymer (e.g., polypropylene) with a rubbery copolymer of two different alpha olefins (e.g., an ethylene-octene copolymer). The rubbery copolymer improves the low temperature impact strength (toughness) of the TPO composition, but it also lowers the flexural modulus (stiffness) of the TPO composition. FIG. 1 shows an exemplary plot of the instrumented impact strength at −30° C. versus flexural modulus for polypropylene homopolymers having a 0.7 g/10 min melt flow index ("MFI"), 4.0 MFI, 12.0 MFI, and 30.0 MFI, respectively, that have been blended with 15% by weight and 30% by weight, respectively, of an ethylene-octene copolymer. The slope of the line defined by the data points for the 15% by weight and 30% by weight ethylene-octene copolymer loadings for each MFI illustrate the stiffness vs. impact tradeoff that occurs by adding the rubbery copolymer to the homopolymer. The tradeoff is affected by the MFI of the homopolymer, but it occurs at all MFI's.

The copolymer component of TPO compositions is relatively expensive, at least as compared to the homopolymer component. Accordingly, it would be highly desirable to minimize the copolymer component of TPO compositions while at the same time retaining the desired mechanical properties. This has heretofore been quite difficult.

One known method for reducing the copolymer content of a TPO composition while retaining desired low temperature impact strength is to add mineral oil to the composition. Oil containing TPO compositions, which are sometimes referred to as oil-extended rubber compositions, display minimal improvements in low temperature impact strength, but do so at a substantially greater loss in flexural modulus. FIG. 2 shows an exemplary plot of instrumented impact strength at −30° C. versus flexural modulus for 4 MFI polypropylene homopolymer blended with 17%, 21% and 25% by weight, respectively, of an ethylene-octene copolymer, and 0.1% to 8% by weight, respectively, of mineral oil. FIG. 2 shows that the relatively low gains in low temperature impact strength are obtained at a significant loss in flexural modulus.

BRIEF SUMMARY OF THE INVENTION

The present invention provides TPO compositions that provide excellent low temperature impact strength (toughness) without significant losses in flexural modulus (stiffness). TPO compositions according to the invention comprise a polyolefin homopolymer resin such as, for example, polypropylene homopolymer, from about 17% by weight to about 30% by weight of a rubbery copolymer comprising at least one alpha olefin, and from about 1.0% to about 8.0% by weight of a nonionic surfactant, which acts as an impact modifying fluid. The preferred nonionic surfactant for use in the invention is an ethoxylated sorbitan fatty acid ester such as ethoxylated sorbitan trioleate. However, other nonionic surfactants can also be used. The nonionic surfactant may be blended with one or more oils, but this tends to reduce the flexural modulus of the TPO compositions without adding significantly to the low temperature impact strength of the TPO compositions.

TPO compositions according to the invention can be used as a lower cost alternative to conventional TPO compositions. TPO compositions according to the invention provide similar or better low temperature impact strength as conventional TPO compositions, but with lower concentrations of rubbery copolymers. Furthermore, TPO compositions according to the invention do not sacrifice as much flexural modulus to obtain the improvements in low temperature impact strength.

The impact modifying fluid in accordance with the invention does not significantly increase the density of the TPO composition like conventional fillers such as calcium carbonate and glass fibers do, and thus can be used to form molded parts that weigh less than conventional impact modified molded parts. Thus, TPO compositions according to the invention are ideal for use in automotive application and in other applications where low temperature impact strength, flexural modulus and lower cost are desired.

The foregoing and other features of the invention are hereinafter more fully described and particularly pointed out in the claims, the following description setting forth, in detail, certain illustrative embodiments of the invention, these being indicative, however, of but a few of the various ways in which the principles of the present invention may be employed.

DETAILED DESCRIPTION OF THE INVENTION

Figure 1:
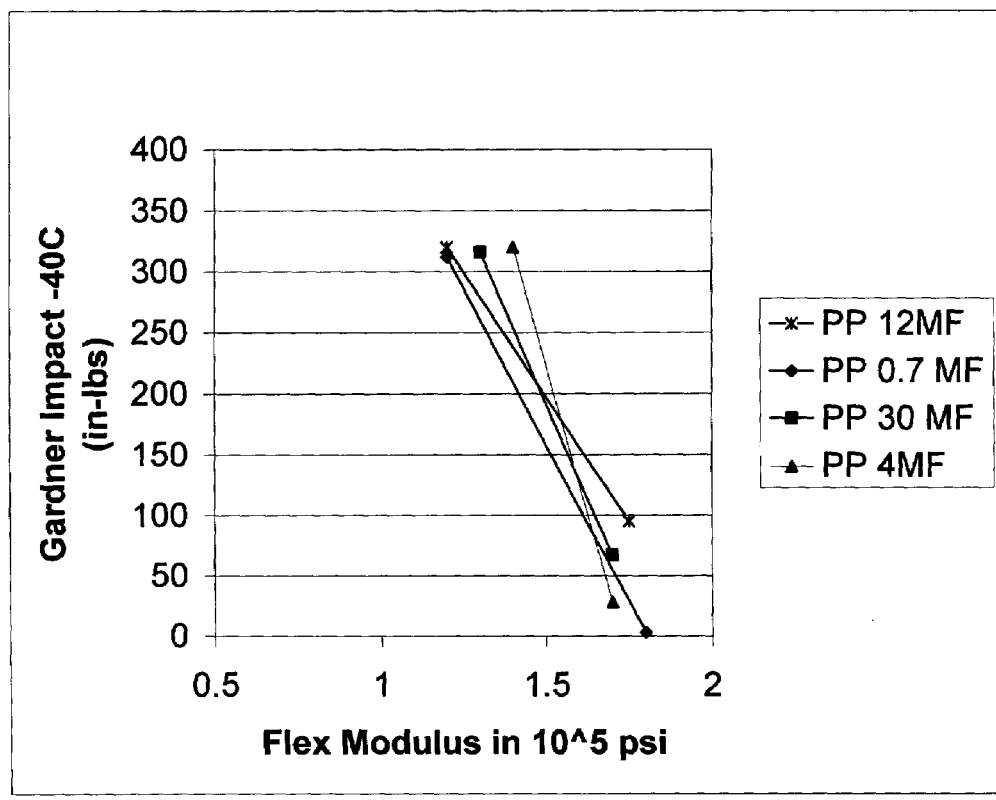
FIG. 1 is an exemplary plot of instrumented impact strength at −30° C. versus flexural modulus for four different MFI's of a polyolefin homopolymer blended with two different amounts of a rubbery copolymer.
Figure 2:
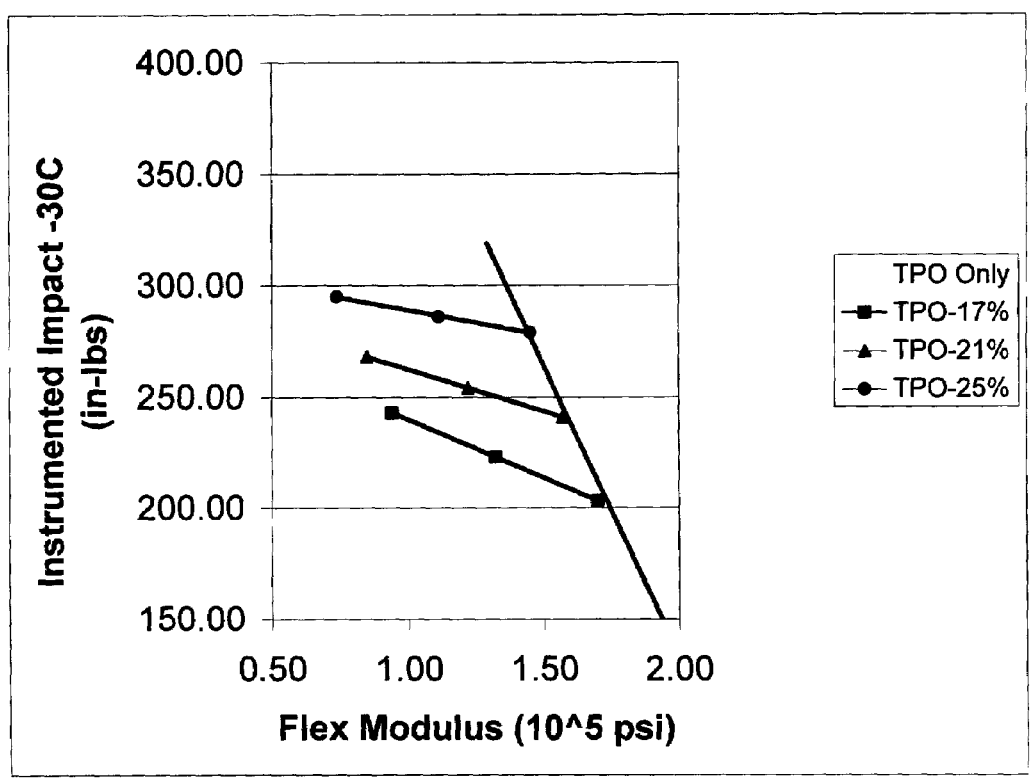
FIG. 2 an exemplary plot of instrumented impact strength at −30° C. versus flexural modulus for a polyolefin homopolymer blended with three different amounts of a rubbery copolymer and three different amounts of mineral oil.

TPO compositions in accordance with the present invention comprise a polyolefin homopolymer resin such as, for example, polypropylene homopolymer, from about 17% by weight to about 30% by weight of a rubbery copolymer comprising at least one alpha olefin, an from about 1.0% to about 8.0% by weight of a nonionic surfactant, which acts as an impact modifying fluid. Optionally, the TPO compositions can further comprise up to about 8.0% by weight of one or more oils.

Virtually any polyolefin homopolymer resin can be used in the invention, including "wide spec" materials. Preferred polyolefin homopolymer resins for use in the invention include, but are not limited to, polyethylene and polypropylene. In the presently most preferred embodiment of the invention, the polyolefin homopolymer resin is a commodity grade polypropylene homopolymer. It will be appreciated that polypropylenes are typically sold in isotactic form, but other forms of polypropylene can also be used (e.g., syndiotactic). Blends of polyolefin homopolymer resins can also be used.

The MFI of the polyolefin homopolymer resins used in the invention is preferably within the range of from about 0.5 g/10 min to about 30 g/10 min, and more preferably within the range of from about 1.0 g/10 min to about 14 g/10 min. The melt flow index of a polymer is generally inversely proportional to its molecular weight. Thus, the higher the molecular weight, the lower the melt flow rate, although this relationship is not linear. Generally speaking, greater improvements in impact strength are observed in low melt flow index polyolefins (e.g., 4 MFI polypropylene homopolymer) as compared with higher melt flow index polyolefins (e.g., 12 MFI polypropylene homopolymer).

As noted above, TPO compositions according to the invention further comprise from about 17% by weight to about 30% by weight of a rubbery copolymer comprising at least one alpha olefin. More preferably, TPO compositions according to the invention comprise from about 17% by weight to about 25% by weight of a rubbery copolymer comprising at least one alpha olefin.

Applicants have discovered that phase instability begins to occur as the rubbery copolymer content of the TPO composition approaches 15% by weight. When the rubbery copolymer concentration is less than about 15% by weight, it is difficult to reliably predict the improvement in low temperature impact strength. Once the rubbery copolymer content of the TPO composition exceeds about 30%, further addition of a nonionic surfactant does not appear to improve the impact strength of the TPO composition. Thus, the rubbery copolymer content of the TPO compositions according to the invention is within the range of from about 17% by weight to about 30% by weight.

Many types and grades of rubbery copolymers comprising at least one alpha olefin are commercially available. The presently most preferred rubbery copolymers for use in the invention are copolymers of ethylene and octene, which are sold by DuPont-Dow Elastomers LLC of Wilmington, Del. under the ENGAGE trade name. However, other copolymers of ethylene and propylene can also be used such as, for example, copolymers available as Montell SD613 from Montell USA and grade 7C55H available from Union Carbide Corporation.

To obtain the desired improvements in low temperature impact strength, without increasing the rubbery copolymer content of the TPO composition and without making substantial sacrifices in the flexural modulus of the TPO composition, the TPO compositions according to the invention must further comprise from about 1.0% by weight to about 8.0% by weight, and more preferably from about 1.25% by weight to about 4.0% by weight, of a nonionic surfactant. The nonionic surfactant preferably includes a fatty acid tail and a polar head, and most preferably, some type of ring structure.

Specific examples of suitable nonionic surfactants for use in the invention include ethoxylated ethers (e.g., polyoxyethylene (23) lauryl ether and polyoxyethylene (10) oleyl ether, which are available from ICI Americas, Inc. as BRIJ 35 and BRIJ 97, respectively), ethoxylated alkylphenols (e.g., nonylphenol ethoxylate, which is available from Huntsman Petroleum Corporation as SURFONIC N-60, and polyoxyethylene octylphenol ether, which is available from Dow Surfactants as TRITON X-100), ethoxylated aryl phenols (e.g., ethoxylated polyarylphenol phosphate ester, which is available from Rhodia Chemical as SOPROPHOR 3D33) and ethoxylated sorbitan fatty acid esters, which are available in a variety of types from a variety of manufacturers under a variety of trade names (e.g., polyoxyethylene sorbitan monolaurate, which is available from the Uniqema division of ICI Americas, Inc. as TWEEN 20, from BASF Corporation as T-MAZ 20, and from Specialty Industrial Products, Inc. as POLISORBAC 20, polyoxyethylene sorbitan monopalmitate, which is available from the Uniqema division of ICI Americas, Inc. as TWEEN 40 and from Specialty Industrial Products, Inc. as POLISORBAC 40, polyoxyethylene sorbitan monostearate, which is available from the Uniqema division of ICI Americas, Inc. as TWEEN 60 and from Specialty Industrial Products, Inc. as POLISORBAC 60, polyoxyethylene sorbitan tristearate, which is available from the Uniqema division of ICI Americas, Inc. as TWEEN 65, from BASF Corporation as T-MAZ 65, and from Specialty Industrial Products, Inc. as POLISORBAC 65, polyoxyethylene sorbitan monooleate, which is available from the Uniqema division of ICI Americas, Inc. as TWEEN 80, from BASF Corporation as T-MAZ 80, and from Specialty Industrial Products, Inc. as POLISORBAC 80, and polyoxyethylene sorbitan trioleate, which is available from the Uniqema division of ICI Americas, Inc. as TWEEN 85, from BASF Corporation as T-MAZ 85, and from Specialty Industrial Products, Inc. as POLISORBAC 85).

Ethoxylated sorbitan fatty acid esters, which are typically obtained via the esterification of sorbitol with one or three molecules of a fatty acid (typically stearic, lauric, oleic, or palmitic) under conditions that cause the splitting out of water from the sorbitol leaving sorbitan, are presently most preferred for use in the invention in view of factors such as performance and cost. Polyoxyethylene sorbitan trioleate ("ESTO") is the presently most preferred ethoxylated sorbitan fatty acid ester for use in the invention.

Notwithstanding the foregoing, depending upon the desired properties in the TPO resin, different nonionic surfactants may be more optimal. The Table 1 below lists the three nonionic surfactants that provided the best performance on eight test properties:

TABLE 1

| Break Strain % | Melt Flow Index |
|---|---|
| sorbitan octadecanoate | ethoxylated polyarylphenol phosphate ester |
| polyoxyethylene (10) oleyl ether | polyoxyethylene (20) sorbitan trioleate |
| polyoxyethylene (20) sorbitan monolaurate | polyoxyethylene (20) sorbitan monolaurate |

| Gardner Impact Strength at 23° C. | Gardner Impact Strength at −40° C. |
|---|---|
| polyoxyethylene octylphenol ether | polyoxyethylene octylphenol ether |

TABLE 1-continued

| | |
|---|---|
| nonylphenol ethoxylate | nonylphenol ethoxylate |
| polyoxyethylene (10) oleyl ether | polyoxyethylene (10) oleyl ether |
| Flexural Modulus | Flexural Strength |
| sodium salt of monoalkylated disulfonated diphenyl oxide where tetrapropylene is the hydrophobe | sodium salt of monoalkylated disulfonated diphenyl oxide where tetrapropylene is the hydrophobe |
| polyoxyethylene (23) lauryl ether | polyoxyethylene (23) lauryl ether |
| polyoxyethylene octylphenol ether | polyoxyethylene octylphenol ether |
| Tensile Strength | Tensile Modulus |
| sodium salt of monoalkylated disulfonated diphenyl oxide where tetrapropylene is the hydrophobe | polyoxyethylene (23) lauryl ether |
| polyoxyethylene (23) lauryl ether | sodium salt of monoalkylated disulfonated diphenyl oxide where tetrapropylene is the hydrophobe |
| polyoxyethylene octylphenol ether | polyoxyethylene (10) oleyl ether |

Figure 3:
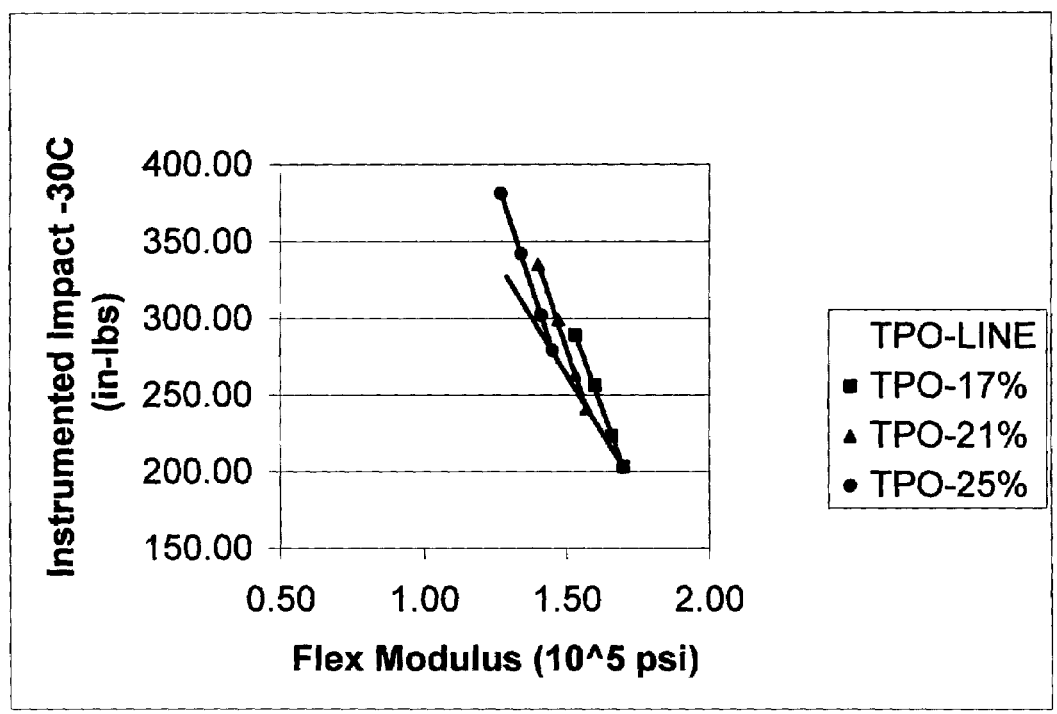
FIG. 3 an exemplary plot of instrumented impact strength at −30° C. versus flexural modulus for a polyolefin homopolymer blended with three different amounts of a rubbery copolymer and three different amounts of a nonionic surfactant according to the invention.

FIG. 3 an exemplary plot of instrumented impact strength at −30° C. versus flexural modulus for a 4.0 MFI polypropylene homopolymer blended with 17% by weight, 21% by weight, and 25% by weight, respectively, of a rubbery copolymer ethylene and octene and 0.1% by weight, 2.0% by weight and 4.0% by weight of ESTO, in accordance with the invention. FIG. 3 shows that it is possible to obtain higher low temperature impact strength by adding a nonionic surfactant to the TPO composition than can be achieved through the addition of greater amounts of the significantly more expensive copolymer material. Furthermore, use of the nonionic surfactant to obtain the desired low temperature impact strength does not result in a significant loss in flexural modulus (stiffness).

TPO compositions according to the invention can further optionally comprise one or more oils such as mineral oil. The oil content of the composition will typically be less than about 8% by weight, and more preferably less than about 4% by weight.

Figure 4:
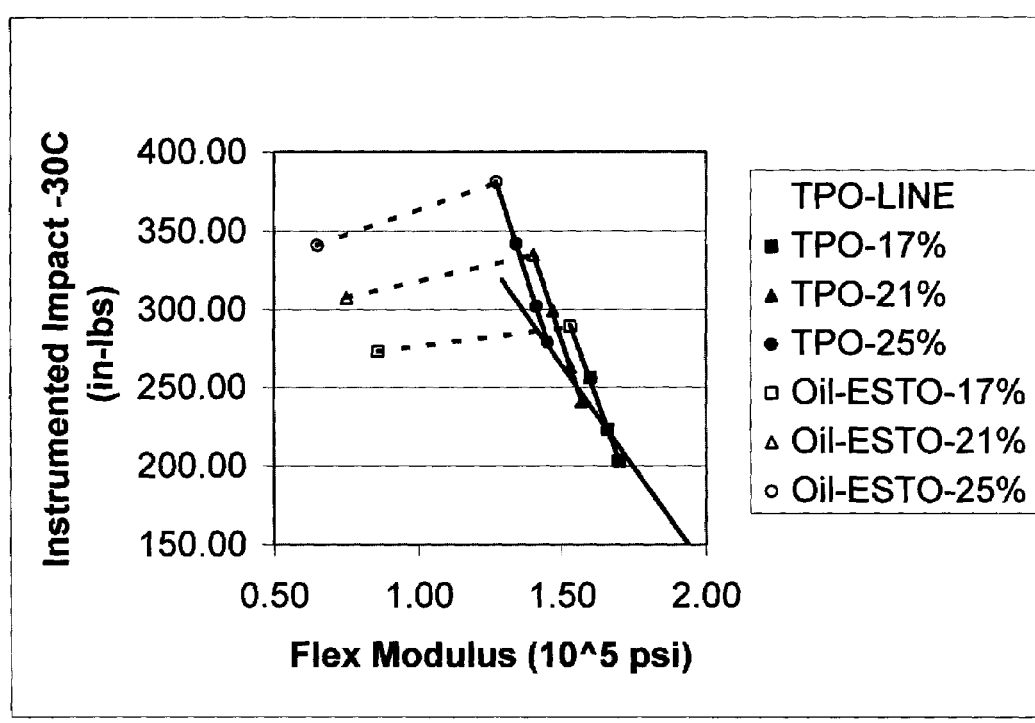
FIG. 4 an exemplary plot of instrumented impact strength at −30° C. versus flexural modulus for a polyolefin homopolymer blended with three different amounts of a rubbery copolymer, a nonionic surfactant and mineral oil according to the invention.

FIG. 4 an exemplary plot of instrumented impact strength at −30° C. versus flexural modulus for a 4.0 MFI polypropylene homopolymer blended with 17% by weight, 21% by weight, and 25% by weight, respectively, of a rubbery copolymer of ethylene and octene, 4.0% by weight of ESTO, and 2.0% by weight mineral oil, in accordance with the invention. FIG. 4 shows that the presence of oil in the TPO compositions according to the invention reduces the low temperature impact strength of the TPO composition somewhat and significantly reduces the flexural modulus of the TPO composition. Use of small amounts of oil in combination with a nonionic surfactant makes it possible to duplicate the low temperature impact strength and flexural modulus provided by a conventional TPO composition while replacing a portion of the relatively expensive rubbery copolymer with the blend of a nonionic surfactant and oil. The oil can be blended or mixed together with the nonionic surfactant easily at virtually any ratio using conventional mixing equipment such as a Cowles mixer.

Oils come in many grades and types. White or light mineral oil is presently preferred for use in the invention. Mineral oil of this type consists of a complex mixture of straight and branched chain saturated hydrocarbons and cyclic saturated hydrocarbons. The concentration and molecular weights of the various constituents of the mineral oil determine the physical characteristics of the mineral oil, such as viscosity. Presently, mineral oil having a viscosity of from about 6 to about 500 centistokes at 40° C., and more preferably about 75 to about 500 centistokes at 40° C., is preferred.

An alternative to mineral oil is polybutylene, which is also known as in the art as polybutene. A variety of polybutenes are available from British Petroleum under the INDOPOL tradename. Applicants have determined that INDOPOL L-14, H-7, and H-100, for example, can be blended in varying amounts with nonionic surfactants to form an effective impact modifying fluid for TPO compositions.

The amount of nonionic surfactant and/or oil used as impact modifying fluids in the TPO compositions according to the invention can be relatively high, with loadings as high as 35% by weight being feasible without too much difficulty. Throughout the instant specification and in the appended claims, the phrase "by weight" shall be understood as meaning by weight of the polyolefin in the composition, unless otherwise clearly indicated. However, applicants have discovered that at high loadings, the TPO compositions will exhibit unusual characteristics, such as visible spherulite fronts and transparent skins overlying opaque white cores. Loadings of from about 2.0% by weight to about 16% by weight, and more preferably from about 2.0% by weight to about 8.0% by weight, are sufficient.

It will be appreciated that the nonionic surfactant and optional oil can be added to the molten polyolefin homopolymer resin at any point. Preferably, the nonionic surfactant and optional oil are preferably added to the molten polyolefin homopolymer resin near the feed throat of an extruder. Alternatively, the nonionic surfactant and optional oil can be added at one inlet or at several inlets and can be used in single and twin screw extruders.

TPO compositions according to the invention may further comprise one or more additives such as are typically used in TPO compositions. Suitable additives include, for example, antioxidants, UV stabilizers, flame retardant additives, pigments and colorants and particulate fillers and fibers. Although conventional additives can be used in the TPO compositions according to the invention, it should be noted that the improved impact resistance properties are adversely affected when the TPO compositions comprise a significant quantity of solid particles having a $D_{50}$ that is greater than about 1.0 µm. Accordingly, in order to maintain the improvements in low temperature impact resistance provided by the nonionic surfactant, any solid particles present in the TPO compositions according to the invention should be very small, which is hereby defined as having a $D_{50}$ of less than about 1.0 μm.

The principal advantage provided by the present invention is that tremendous improvements in the impact strength of TPO compositions can be obtained at the expense of a relatively small sacrifice in stiffness. Thus, polyolefin homopolymer resins, which generally exhibit fairly good stiffness until blended with rubbery copolymers, can be engineered to retain a substantial amount of their desirable stiffness properties, but can be modified to provide low temperature impact strength properties that were heretofore only achievable through the use of larger amounts of costly copolymers. In other words, the nonionic surfactant does not impart stiffness to the TPO composition. It merely preserves the stiffness of the underlying TPO composition while improving the low temperature impact strength.

Use of a nonionic surfactant as an impact modifying fluid provides another unexpected yet highly desirable advantage. It is known that conventional TPO compositions sometimes release volatile components when exposed to heat. In automotive applications, the volatile components sometimes condense on the interior surface of glass windshields thereby creating a haze or fog. It is believed that some of the constituents of mineral oils and other diluents used to improve low temperature impact strength in such compositions may contribute to the "fogging" problem.

Surprisingly, the use of nonionic surfactants, and particularly ethoxylated sorbitan fatty acid esters, as impact modifying fluids tends to reduce the degree of "fogging" observed in molded impact modified thermoplastic olefin compositions. It is theorized that the nonionic surfactants "bind up" the oligomers, which prevents them from exuding to the surface of the part. This allows for use of "wide spec" rubbery copolymers in applications where the part is to be painted. In conventional TPO blends, only "narrow spec" rubbery copolymers could be used. This provides additional cost savings. If oil is going to be included in the composition, then a non-volatile oil such as PARALUX 6001 or DRAKEOL 34 should be used to reduce the likelihood of fogging.

The nonionic surfactant and optional oil can be batch mixed and extruded into pellets for further melt processing. Alternatively, the nonionic surfactant and optional oil can be added to the molten polymer resins by a fluid pump in a single or twin screw extruder. It is known that oil can cause screw slippage, so when the impact modifying fluid comprises a mixture of a nonionic surfactant and oil, it is preferably to add the nonionic surfactant by batch mixing and to separately feed the oil just downstream of the feedthroat of the extruder.

Applicants believe that an impact modifying fluid comprising a combination of a nonionic surfactant and an oil compatibilizes the rubbery copolymer and the polyolefin homopolymer resin(s). However, when the impact modifying fluid comprises only a nonionic surfactant, the rubbery copolymer appears to be less compatible with the polyolefin homopolymer resin. Thus, the mechanism appears to be complicated. The presence of a nonionic surfactant in the TPO olefin compositions according to the invention leads to more distinct rubber domains of smaller size (~60 nm) than are observed in conventional TPO compositions (~480 nm).

Additional advantages provided by use of the impact modifying fluid according to the invention include an improvement in elongation at break. In other words, TPO compositions in accordance with the invention will stretch somewhat before breaking and are thus less brittle (ductile failure) than conventional TPO compositions. The nonionic surfactant that serves as the impact modifying fluid is significantly less dense than calcium carbonate and glass fiber, and thus molded parts formed from TPO compositions according to the invention will generally weigh less than molded parts formed from conventional TPO compositions.

Injection-molded parts formed from TPO compositions according to the invention exhibit reduced permanent stress whitening upon flex. Thus, molded parts that include hinges will not whiten or show wear as readily. Typically, molded parts formed from TPO compositions according to the invention are black (by incorporation of carbon black to the composition), which sometimes masks the improvements in reduced permanent stress whitening.

The nonionic surfactant and optional oil can be mixed with the molten polymer using conventional polymer processing equipment, and provides improved properties at lower cost without the use of hazardous materials.

Those having skill in the art would expect that adding a nonionic surfactant to a TPO composition would lead to plasticization of the TPO composition rather than impact modification. The mechanism achieved by the present invention is clearly not plasticization. TPO compositions according to the invention retain substantial tensile strength and toughness, but exhibit surprisingly improved impact strength, particularly at low temperatures. The improvement in impact strength without a corresponding degradation in tensile strength is substantially better than that previously observed in plasticized systems.

The exact mechanism by which the nonionic surfactant increases the impact strength of TPO compositions according to the invention is not presently known. One theory for increasing the impact strength of a polymer composition is to give the polymer chains greater freedom to move: the greater the freedom to move, the greater the ability of the polymer to dissipate energy, and thus the higher the impact strength of the material. The addition of a nonionic surfactant to a TPO composition in accordance with the invention very clearly increases the viscous properties of the TPO composition. Adding the nonionic surfactant to polyolefins decreases glass transition temperature ($T_g$) and increases the loss modulus and tan δ (which is a ratio of lost to stored energy), which increases in the mobility of the polymer chains molecules at $T_g$. The reduction in viscosity of the molten TPO composition according to the invention allows for better flow, which makes it easier to mold intricate parts.

The presence of the nonionic surfactant tends to reduce the degree of crystallinity in the TPO composition. The presence of the nonionic surfactant also has an effect on crystallite size, nucleation density, and the thickness of the skin layer in injection-molded parts, which contribute to the improvements in impact strength observed in the material. Transmission electron microscope images of samples stained with ruthenium (which partitions into ESTO and mineral oil, but not into polypropylene) indicate condensed structures that are approximately spherical with diameters within the range of from about 4 to about 300 nm.

When a nonionic surfactant is added to a TPO composition according to the invention, the nucleation density of the material tends to increase, the spherulite size tends to decrease, and the thickness of the molded skin layer tends to decrease. In contrast, when a nonionic surfactant is added to a polyolefin homopolymer resin such as polypropylene homopolymer (without any rubbery copolymer), the nonionic surfactant tends to decrease the nucleation density, increase the spherulite size, and have very little affect on the thickness of the molded skin layer. Thus, in the case of TPO compositions, the reduction in nucleation density and crystallite size appear to play a more important role in increasing the impact strength of the material.

Addition of the nonionic surfactant also introduces an additional secondary transition at lower temperatures. It is believed that high impact strength materials have prominent low temperature damping peaks due to either the motions of the shorter main chain segments than those involved in the primary transitions, the crankshaft rotation of short methylene main chain segments, secondary glass transitions or a second rubbery phase as in high impact polyblends. The secondary phase introduced by the nonionic surfactant of the present invention seems to provide higher impact strength at lower temperatures.

The following examples are intended only to illustrate the invention and should not be construed as imposing limitations upon the claims.

EXAMPLE 1

Base Polyolefin Homopolymer Compositions A, B and C were formed by melt blending the components shown in weight percent in Table 2 below in a twin screw extruder:

PETROTHENE 31S3A is a 3 MFI polypropylene homopolymer available from Equistar Chemicals, LP. POLYBOND 3200 is a maleic anhydride grafted polypropylene available from Crompton Corporation. IRGANOX B225 is a thermal stabilizer available from Ciba Specialty Chemicals, Inc. TWEEN 85 is an ethoxylated sorbitan trioleate ("ESTO") available from ICI Americas, Inc. And, DRAKEOL 7 NF is a light mineral oil available from Penreco.

Base Polyolefin Homopolymer Compositions A, B and C were extruded through a strand die, cooled in a water bath, air wiped and then cut into pellets.

TPO Compositions 1, 2 and 3, respectively, were formed in a second extrusion process wherein pellets of Base Polyolefin Homopolymer Compositions A, B and C, respectively, were combined with a metallocene catalyzed low density ethylene-octene copolymer available from DuPont-Dow Elastomers as ENGAGE 8100 and the other components shown in weight percent in Table 3 below (TPO Compositions 4 and 5, which did not contain a nonionic surfactant and oil, were control samples):

TABLE 3

| COMPONENT | 1 | 2 | 3 | 4 | 5 |
|---|---|---|---|---|---|
| POLYOLEFIN COMPOSITION A | 66.10 | — | — | — | — |
| POLYOLEFIN COMPOSITION B | — | 78.60 | — | — | — |
| POLYOLEFIN COMPOSITION C | — | — | 66.10 | — | — |
| PETROTHENE 31S3A | — | — | — | 66.10 | 78.60 |
| ENGAGE 8100 | 30.00 | 17.50 | 30.00 | 30.00 | 17.50 |
| IRGANOX B225 | 0.25 | 0.25 | 0.25 | 0.25 | 0.25 |
| DSTDP FLAKE | 0.15 | 0.15 | 0.15 | 0.15 | 0.15 |
| KEMAMIDE W-40 | 0.25 | 0.25 | 0.25 | 0.25 | 0.25 |
| CALCIUM STEARATE 12B | 0.25 | 0.25 | 0.25 | 0.25 | 0.25 |
| BLACK COLOR 2447 | 3.00 | 3.00 | 3.00 | 3.00 | 3.00 |
| TOTAL | 100.00 | 100.00 | 100.00 | 100.00 | 100.00 |

TABLE 2

| COMPONENT | A | B | C |
|---|---|---|---|
| PETROTHENE 31S3A | 91.75 | 84.75 | 77.75 |
| POLYBOND 3200 | 2.00 | 2.00 | 2.00 |
| IRGANOX B225 | 0.25 | 0.25 | 0.25 |
| TWEEN 85 | 0.6 | 1.30 | 2 |
| DRAKEOL 7 NF | 5.4 | 11.70 | 18 |
| TOTAL | 100.00 | 100.00 | 100.00 |

DSTDP FLAKE is a distearyl thiodipropionate antioxidant available from Witco Corp/Argus Division. KEMAMIDE W-40 is an ethylene bis stearamide wax available from Witco Corp. CALCIUM STEARATE 12B is a grade of calcium stearate available from Ferro Corporation. BLACK COLOR 2447 is a color concentrate available from Southwest Chemical.

In each case, the material was extruded through a strand die, cooled in a water bath, and then formed into pellets. The pellets were then molded into test bars using a conventional injection molding process. The results of standardized testing on the injection molded test bars are reported in Table 4 below:

TABLE 4

| TEST/PROPERTY | 1 | 2 | 3 | 4 | 5 |
|---|---|---|---|---|---|
| Tensile Strength (psi) (ASTM D 638) | 2598 ± 8 | 2663 ± 131 | 2249 ± 10 | 2489 ± 2 | 3794 ± 61 |
| Tensile Yield strain (%) (ASTM D 638) | 22.5 ± 0.5 | 23 ± 1 | 35 ± 2 | 13 ± 0.3 | 8.9 ± 0.4 |
| Tensile Break Strain (%) (ASTM D 638) | 429.2 ± 119 | 579.7 ± 29 | 592 ± 1 | 45 ± 0.8 | 326 ± 208 |
| Young's Modulus ($10^5$ psi) (ASTM D 638) | 1.2 ± 0.1 | 1 ± 0.1 | 0.6 ± 0.1 | 1.4 ± 0.3 | 2.1 ± 0.2 |
| Flex Strength (psi) | 3309 ± 67 | 3151 ± 30 | 2056 ± 44 | 3521 ± 38 | 5765 ± 68 |

TABLE 4-continued

| TEST/PROPERTY | 1 | 2 | 3 | 4 | 5 |
|---|---|---|---|---|---|
| (ASTM D 790) | | | | | |
| Flex Modulus ($10^5$ psi) (ASTM D 790) | 0.8 ± 0.1 | 0.8 ± 0.1 | 0.4 ± 0.1 | 1.1 ± 0.1 | 2.0 ± 0.1 |
| HDT at 264 psi (° C.) (ASTM D 648) | 50 ± 1 | 50 ± 1 | 44 ± 1 | 53 ± 1 | 56 ± 2 |
| HDT at 66 psi (° C.) (ASTM D 648) | 67 ± 1 | 67 ± 1 | 60 ± 1 | 67 ± 1 | 81 ± 1 |
| Gardner Impact 23° C. (in-lbs) (ASTM D 5420) | 272 ± 4 | >320 | >320 | >320 | 287 |
| Gardner Impact −20° C. (in-lbs) (ASTM D 5420) | >320 | >320 | 232 | 232 | 18 |
| Gardner Impact −40° C. (in-lbs) (ASTM D 5420) | 272 | 168 | 304 | — | <8 |

TPO Compositions 1, 2 and 3, which contained a nonionic surfactant (ESTO) and oil, exhibited improved Gardner impact strength at −20° C. and improved instrumented impact as compared to control TPO Compositions 4 and 5, which did not include the ESTO/oil mixture.

EXAMPLE 2

TPO Compositions 6–14 were formed by melt blending the components shown in weight percent in Table 5 below in a twin screw extruder:

TABLE 5

| COMPONENT | 6 | 7 | 8 | 9 | 10 | 11 | 12 | 13 | 14 |
|---|---|---|---|---|---|---|---|---|---|
| SUNOCO D040W6 | 75.35 | 79.25 | 67.35 | 71.25 | 79.35 | 83.25 | 79.25 | 79.45 | 77.45 |
| ENGAGE 8999 | 17 | 17 | 25 | 25 | 13 | 13 | 17 | 17 | 17 |
| PARALUX 6001 | 0.1 | 0.1 | 0.1 | 0.1 | 0.1 | 0.1 | 0.1 | 0 | 0 |
| TWEEN 85LM | 4.0 | 0.1 | 4.0 | 0.1 | 4.0 | 0.1 | 0.1 | 0 | 2.0 |
| IRGANOX B-255 | 0.25 | 0.25 | 0.25 | 0.25 | 0.25 | 0.25 | 0.25 | 0.25 | 0.25 |
| TINUVIN 770 | 0.2 | 0.2 | 0.2 | 0.2 | 0.2 | 0.2 | 0.2 | 0.2 | 0.2 |
| CHIMASORB 944 | 0.1 | 0.1 | 0.1 | 0.1 | 0.1 | 0.1 | 0.1 | 0.1 | 0.1 |
| BLACK EMA 2525 | 3 | 3 | 3 | 3 | 3 | 3 | 3 | 3 | 3 |

SUNOCO D040W6 is a 5 MFI polypropylene homopolymer available from Sunoco Chemicals. ENGAGE 8999 is an ethylene-octene copolymer available from Dupont-Dow Elastomers. PARALUX 6001 is a paraffinic process oil available from Chevron Texaco Corp. TWEEN 85LM is an ethoxylated sorbitan trioleate ("ESTO") available from ICI Americas, Inc. IRGANOX B-255 is a thermal stabilizer available from Ciba Specialty Chemicals, Inc. TINUVIN 770 is a hindered amine light stabilizer available from Ciba Specialty Chemicals, Inc. CHIMASORB 944 is hindered amine stabilizer available from Ciba Specialty Chemicals, Inc. And, BLACK EMA 2525 is a 30% carbon black EMA concentrate available from Southwest Chemical.

The molten polymers were extruded through a strand die, water cooled, and the strands were cut to form pellets. The pellets were then molded into test bars using a conventional injection molding process. The results of standardized testing on the injection molded test bars are reported in Table 6 below:

TABLE 6

| TEST | 6 | 7 | 8 | 9 | 10 | 11 | 12 | 13 | 14 |
|---|---|---|---|---|---|---|---|---|---|
| I | 1.6 ± 0.1 | 1.7 ± 0.2 | 1.3 ± 0.1 | 1.4 ± 0.1 | 1.7 ± 0.1 | 1.9 ± 0.1 | 1.6 ± 0.1 | 1.4 ± 0.2 | 1.3 ± 0.2 |
| II | 322 ± 14 | 172 ± 61 | 318 ± 38 | 355 ± 18 | 52 ± 24 | 87 ± 48 | 9 ± 9 | 14 ± 5 | 150 ± 5 |
| III | 3 | 0 | 5 | 5 | 0 | 0 | — | — | — |
| IV | 3450 ± 83 | 3900 ± 100 | 2980 ± 50 | 3320 ± 60 | 3710 ± 20 | 3980 ± 60 | 3900 ± 100 | 3700 ± 100 | 3540 ± 100 |
| V | 11 ± 1 | 10 ± 1 | 14 ± 1 | 12 ± 1 | 10 ± 1 | 10 ± 1 | 10 ± 1 | — | — |
| VI | 320 ± 60 | 280 ± 70 | 300 ± 100 | 200 ± 100 | 300 ± 100 | 370 ± 100 | 280 ± 70 | 290 | 280 |
| VII | 1.85 ± 0.05 | 1.8 ± 0.2 | 1.8 ± 0.2 | 1.8 ± 0.1 | 1.9 ± 0.1 | 1.9 ± 0.1 | 1.7 ± 0.2 | — | — |
| VIII | 4920 ± 90 | 5400 ± 330 | 4060 ± 100 | 4500 ± 100 | 5300 ± 200 | 5930 ± 30 | 5400 ± 300 | — | — |
| IX | 262 ± 20 | 260 ± 10 | 260 ± 30 | 260 ± 40 | 290 ± 10 | 257 ± 20 | 260 ± 10 | — | — |
| X | 280 ± 40 | 9 ± 3 | >320 | >320 | 54 ± 10 | <8 | 9 ± 3 | 14 ± 5 | 150 ± 10 |
| XI | 4.25 ± 0.05 | 3.4 | 4 | 3.5 | 4.4 | 3.8 | 3.4 | 4.4 | 4.4 |
| XII | 0.92 ± 0.01 | 0.92 ± 0.01 | 0.92 | 0.92 | 0.92 | 0.92 | 0.92 | — | — |

Test I: Flexural modulus pursuant to ASTM D 790 (units=$10^5$ psi); Test II: Instrumented impact strength at −30° C. pursuant to ASTM D 3763 (units=in-lbs); Test III: Ductile failures pursuant to ASTM D 3763 (units=an integer which represents the number of samples tested that exhibited ductile failure out of 5 tests); Test IV: Tensile strength pursuant to ASTM D 638 (units=psi); Test V: Yield strain pursuant to ASTM D 638 (units=%); Test VI: Break strain pursuant to ASTM D 639 (units=%); Test VII: Tensile modulus pursuant to ASTM D 638 (units=$10^5$ psi); Test VIII: Flexural strength pursuant to ASTM D 790 (units=psi); Test IX: Gardner impact strength at 23° C. pursuant to ASTM D 5420 (units=in-lbs); Test X: Gardner impact strength at −30° C. pursuant to ASTM D 5420 (units=in-lbs); Test XI: Melt flow index pursuant to ASTM D 1238 (units=g/10 min); and Test XII: Specific gravity pursuant to ASTM D 792 (units=g/cc).

Examples 10 and 11 show that the improvement in low temperature impact strength (Test X) provided by use of an impact modifying fluid (ESTO) is significant in compositions comprising as little as 13% by weight of copolymer, but not substantial enough to make such compositions suitable as a replacement for conventional TPO compositions. Examples 8 and 9 show that the improvement in low temperature impact strength (Test X) is not appreciable in compositions comprising high levels of the copolymer (25% by weight in this case, but this upper limit will vary depending upon the MFI of the homopolymer and the choice of copolymer and can reach 30% by weight). Examples 6 and 7 show that there is an substantial improvement in low temperature impact strength (Test X) when an impact modifying fluid (ESTO) is incorporated into a composition comprising 17% by weight of copolymer. This material is suitable for use as a cost-effective replacement for conventional TPO compositions. Examples 12, 13 and 14 demonstrate that the impact modifying fluid (ESTO) is responsible for the substantial improvement observed in low temperature impact strength for compositions comprising 17% by weight of copolymer. The Examples further show that the ductility of compositions according to the invention comprising 17% by weight of copolymer is enhanced by incorporation of ESTO. Furthermore, the Examples show that these low temperature impact strength enhancements occur with no loss of tensile strength, flex strength and at no increase in specific gravity.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. An impact modified thermoplastic olefin composition consisting essentially of a blend of one or more polyolefin homopolymer resins, from about 17% by weight to about 30% by weight of one or more rubbery copolymers comprising at least one alpha olefin, from about 1.0% to about 8.0% by weight of one or more nonionic surfactants, and mineral oil or polybutene, provided that the mineral oil or polybutene is present in an amount that does not exceed 8% by weight.

2. The impact modified thermoplastic olefin composition according to claim 1 wherein the polyolefin homopolymer resin is a polypropylene homopolymer.

3. The impact modified thermoplastic olefin composition according to claim 1 wherein the nonionic surfactant is selected from the group consisting of ethoxylated ethers, ethoxylated alkylphenols, ethoxylated aryl phenols and ethoxylated sorbitan fatty acid esters.

4. The impact modified thermoplastic olefin composition according to claim 1 wherein the nonionic surfactant is selected from the group consisting of polyoxyethylene sorbitan monolaurate, polyoxyethylene sorbitan monopalmitate, polyoxyethylene sorbitan monostearate, polyoxyethylene sorbitan tristearate, polyoxyethylene sorbitan monooleate and polyoxyethylene sorbitan trioleate.

5. The impact modified thermoplastic olefin composition according to claim 4 wherein the nonionic surfactant is polyoxyethylene sorbitan trioleate.

6. The impact modified thermoplastic olefin composition according to claim 1 having an instrumented impact strength at −30° C. of 100 in-lbs or greater as measured in accordance with ASTM D 5420 and a flexural modulus of $1.4 \times 10^5$ psi or greater as measured in accordance with ASTM D 790.

* * * * *